United States Patent
Kosheleff

(10) Patent No.: US 8,382,030 B2
(45) Date of Patent: Feb. 26, 2013

(54) VARIABLE CYCLE VTOL POWERPLANT

(76) Inventor: Patrick A. Kosheleff, Yankee Hill, CA (US)

( * ) Notice: Subject to any disclaimer, the term of this patent is extended or adjusted under 35 U.S.C. 154(b) by 320 days.

(21) Appl. No.: 12/807,311

(22) Filed: Sep. 2, 2010

(65) Prior Publication Data

US 2012/0056034 A1    Mar. 8, 2012

(51) Int. Cl.
*B64C 29/00* (2006.01)

(52) U.S. Cl. ..................... 244/23 B; 244/53 R

(58) Field of Classification Search ............... 244/23 B, 244/23 A, 12.3, 12.1, 7 A, 7 R, 6, 53 R; 60/792
See application file for complete search history.

(56) References Cited

U.S. PATENT DOCUMENTS

| | | | |
|---|---|---|---|
| 3,016,698 A | 1/1962 | Sobey | |
| 3,149,461 A | 9/1964 | Eichholtz | |
| 3,280,560 A | 10/1966 | Marchant et al. | |
| 3,472,487 A | 10/1969 | Moellmann | |
| 3,867,813 A | 2/1975 | Leibach | |
| 5,275,356 A | 1/1994 | Bollinger et al. | |
| 6,892,980 B2 | 5/2005 | Kawai | |

*Primary Examiner* — Tien Dinh
*Assistant Examiner* — Richard R Green

(57) ABSTRACT

A VTOL aircraft powerplant choosing between a low-power, turbofan mode during cruise flight and a high-power, lift fan mode during vertical flight. Turbofan mode is a gas turbine engine's shaft power driving a remote front fan. Its fan flow goes to thrust for cruising flight. During VTOL, front fan output enters a boost compressor. It produces the compressed air for a combustion chamber which feeds a large lift-fan turbine. That is the implementation of lift-fan mode. The boost compressor has more stages than the front fan and is a big added load. The gas turbine engine is supercharged to turn that added load: Part of the boost compressor output is taken during VTOL. This is a new version of the supercharging. During cruise flight, a low pressure turbine stage is bypassed to match the lesser load. That completes the apparatus for a variable-cycle VTOL engine.

5 Claims, 4 Drawing Sheets

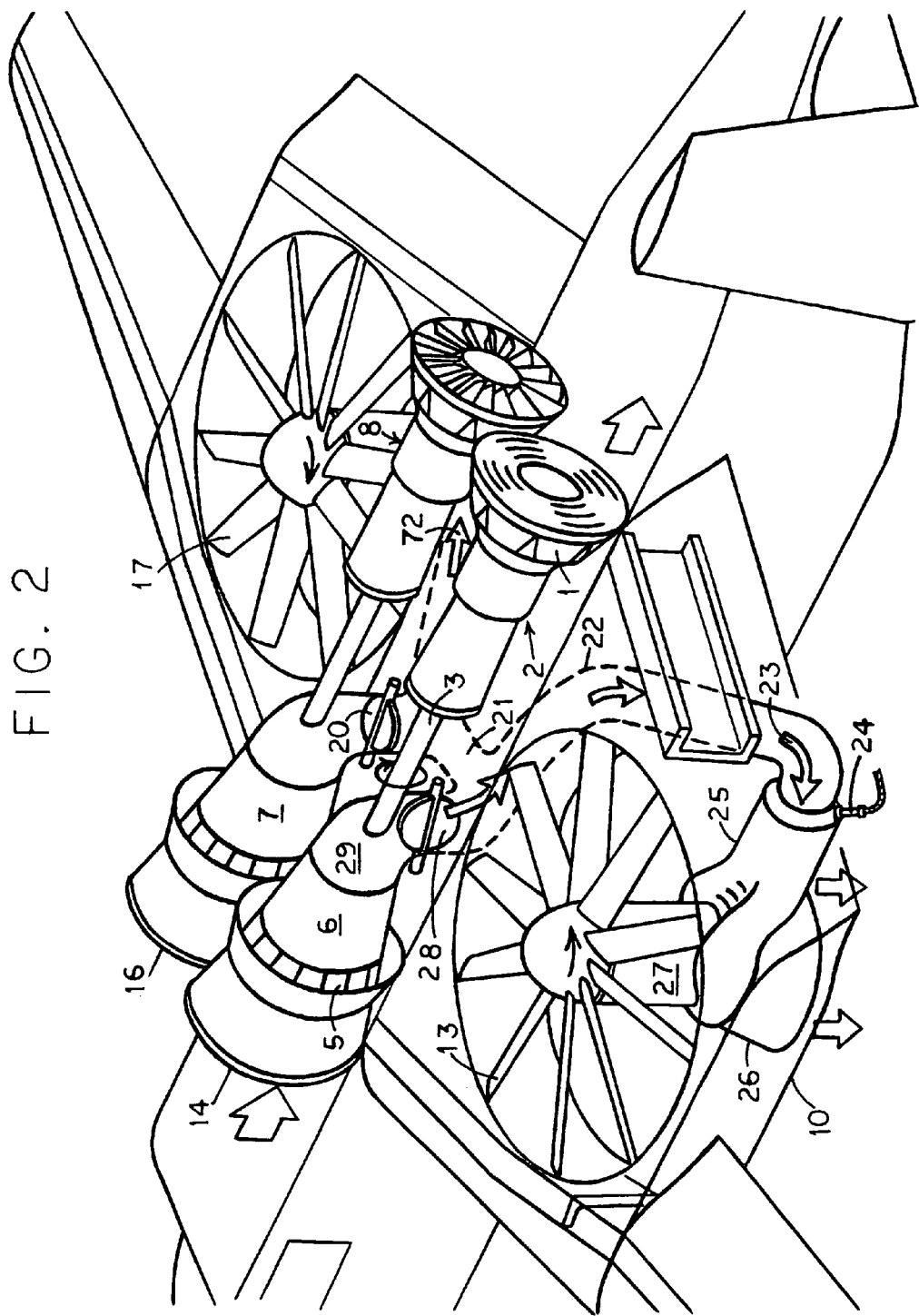

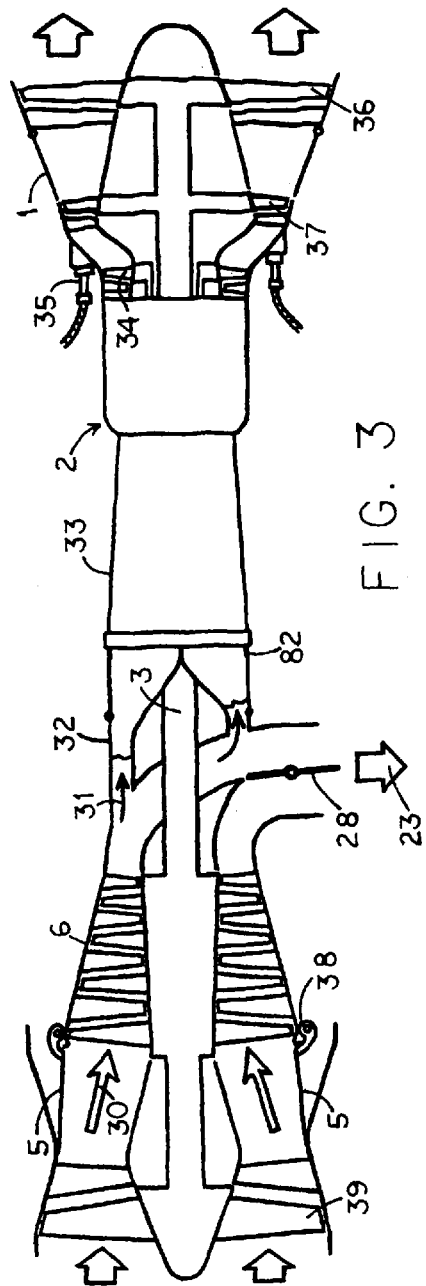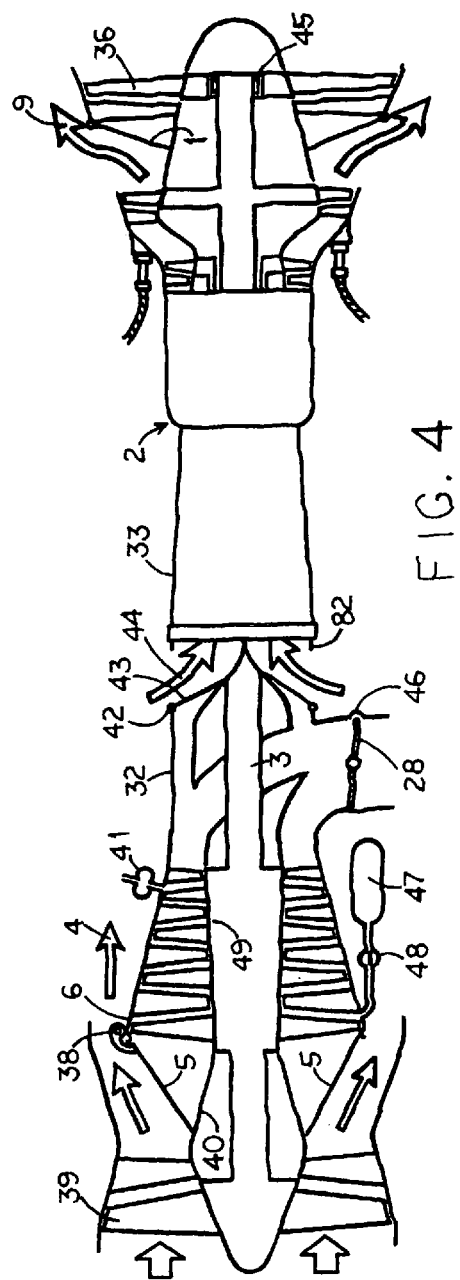

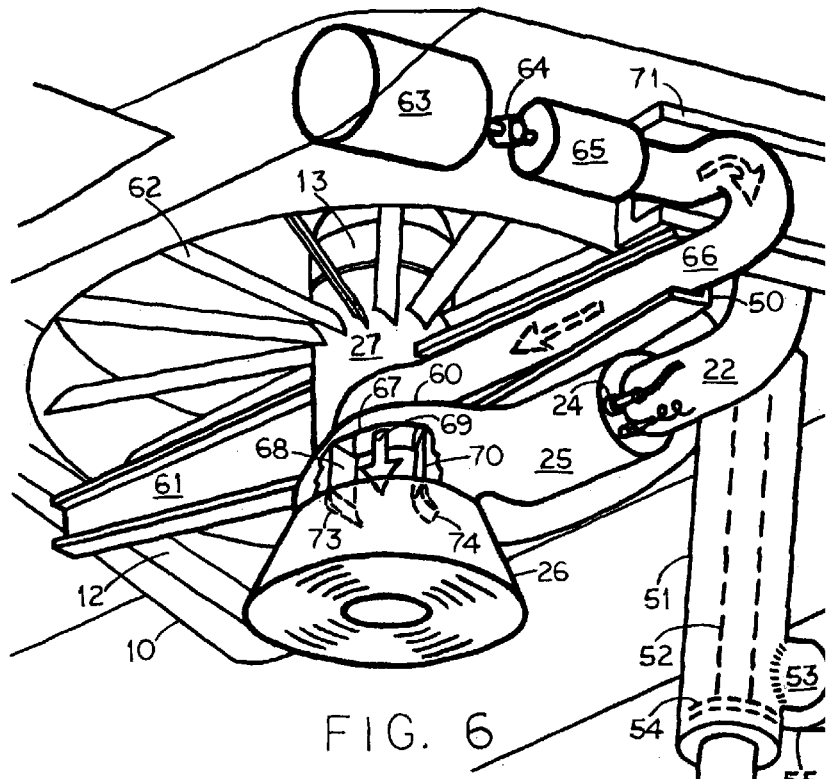
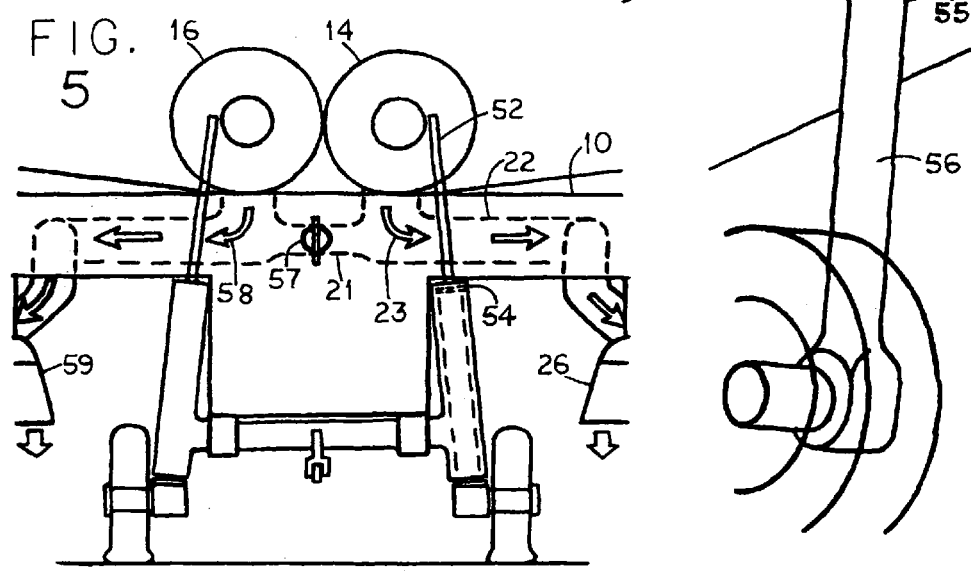

VARIABLE CYCLE VTOL POWERPLANT

BACKGROUND OF THE INVENTION

The following two US patents are aircraft turbofans with valves for the fan output air which select a cruise mode or a high-power mode:

U.S. Pat. No. 3,149,461 has a jet engine which also turns a remote compressor by a driveshaft. The compressed air output of the remote compressor can go to a much larger fan power unit, under control of his valve 15. The compressed air becomes the working fluid for the larger unit. It resembles ours, but some of his air always goes to thrust via his tapping 23.

U.S. Pat. No. 5,275,356 a front fan's outflow travels a fan duct to the exhaust nozzle where it produces thrust for cruise flight. During VTOL flight the nozzle turns down to generate lift; valves divert some fan air to a boost compressor remotely driven by a driveshaft. The boost compressor feeds a combustion chamber whose output powers a lift fan turbine. This is similar to ours, but it takes him two valves to control the front fan output: Valve 102 and fan duct blocking door 122 in his FIG. 2.

Early versions of our main flow control valve:

U.S. Pat. No. 3,016,698 a circumferential ring of hinged, overlapping flaps squeezes down or flares out to send a low pressure compressor output directly to a duct burner or else to a boost compressor in a turbojet.

U.S. Pat. No. 3,280,560 for a preferred shape of the flaps in its FIGS. 5 and 6.

This US patent for a VTOL aircraft powerplant has cycle variability:

U.S. Pat. No. 3,867,813 is a two-spool turbofan whose low-pressure spool turns a large front fan to give extra air mass flow for VTOL operation. Cruising flight is without the extra air. Its FIG. 1 shows mechanical variability of the intake airflow into the core spool, thereby enabling the front fan to supercharge the core engine during VTOL operation. His apparatus is variable-incidence blading in the large front fan. The blading "feathers" to pump no air during cruising flight. We adopt the idea of supercharging but implement it differently.

U.S. Pat. No. 3,472,487 shows a turboshaft engine with a multistage power turbine. The last stages have pivoted doors to bypass working fluid around a stage during certain operating conditions. A bypassed stage also has a freewheel clutch for less churning loss. We use both features.

Lift fan airliner design study, Aviation Week and Space Technology, 7-29-91, page 57: Lift fan placement, second combustion chamber, lift fan turbine, and compressed air duct are in principle the same as ours. However, the compressed air is bleed flow from a bank of gas turbine engines.

The emergency power system when one engine fails during VTOL:

U.S. Pat. No. 3,093,968 Stored monopropellant decomposes to generate substitute working gas for the turbine. Our design goes one step further.

SUMMARY OF THE INVENTION

A VTOL aircraft powerplant which delivers a small amount of power for cruising flight but a large amount of power for vertical flight. The power is manifested as turbofan operation during cruise flight, and lift fan operation during vertical flight. The lift fan is much bigger than the front fan of the turbofan and requires much more power during VTOL flight.

The turbofan engine is actually a gas turbine engine which turns a remote front fan through a driveshaft, thereby making a "cruise" engine. Adding a boost compressor, a flow valve, a second combustion chamber and a lift fan turbine makes a "VTOL" engine.

The front fan is the first compression step in generating working gas for the VTOL engine. The boost compressor shaft-driven from the gas turbine engine is placed behind the front fan. The boost compressor takes the fan output and raises its pressure ratio high enough for a thermodynamic cycle in the VTOL engine.

The boost compressor only works during VTOL flight. A single flow control valve is between the front fan and the boost compressor. It is a pivoted-flaps, circumferential valve of a type known in the art. The flaps, or "petals", have two positions. In the first position, the noses of the petals contract inward, thereby directing the output of the front fan to the outside and rearward, to generate forward thrust. In the second position, the flaps flare outward against the inside of the fan duct to trap the fan flow and feed it to the boost compressor. Its compressed air output goes to the second combustion chamber and then to the lift fan turbine.

The boost compressor for the large VTOL engine is such a big added load on the driveshaft that the gas turbine engine must be supercharged to greatly increase the power available at the driveshaft during VTOL. A low-pressure version of the supercharging is already known. In ours, ducting is added to some boost compressor discharge and some compressed air is taken as the new intake air for the gas turbine engine. The high-pressure compressed air's greater density raises the power of the gas turbine engine by at least half again (and close to doubles it.) Reheat may be fitted for even more power.

When VTOL flight ends, moveable doors in the ducting re-select ambient air for the intake to the gas turbine engine, whose power output drops considerably. During cruising flight, bypass doors in the turbine housing pivot inward to block the flow path and create an early exit for the working gas. This disables a low pressure turbine stage. It adapts to the lesser load when the boost compressor is not pumping. Similar apparatus is known in the art.

A shutoff valve downstream of the boost compressor closes off its cavity during cruising flight. Air is pumped out of the blocked-off cavity to cut the churning loss way down. This new feature lets the rotor of the boost compressor to be solidly attached to the driveshaft. It strengthens and stiffens the driveshaft in the long driveline.

A VTOL aircraft sustained by two lift fans individually powered would crash if one of the powerplants failed. It is known to inject into the turbine some emergency fuel created as the decomposition gases from stored liquid hydrogen peroxide. The present invention goes one step further and preserves the high pressure of the decomposition gases before they begin work-producing expansion. The liftfan turbine is re-configured to be a partial-admission turbine. Moveable flaps restrict the admission arc of the turbine and avoid a free-expansion loss before work-producing expansion begins.

BRIEF DESCRIPTION OF THE SEVERAL VIEWS

FIG. 2 is a diagonal overhead view of the aircraft during VTOL flight.

FIG. 3 is an elevation view showing in outline form the main components of the powerplant configured for VTOL flight.

FIG. 4 is an elevation view showing in outline form the main components of the powerplant configured for cruising flight.

FIG. 5 is an elevation view of the front of the aircraft after landing, and showing the lift fan turbine working fluid distribution ducts in dashed lines.

FIG. 6 is a diagonal underside view of the lift fan turbine and its working fluid ducting, including emergency supply; also shows the main landing gear.

DETAILED DESCRIPTION

Figure 1:
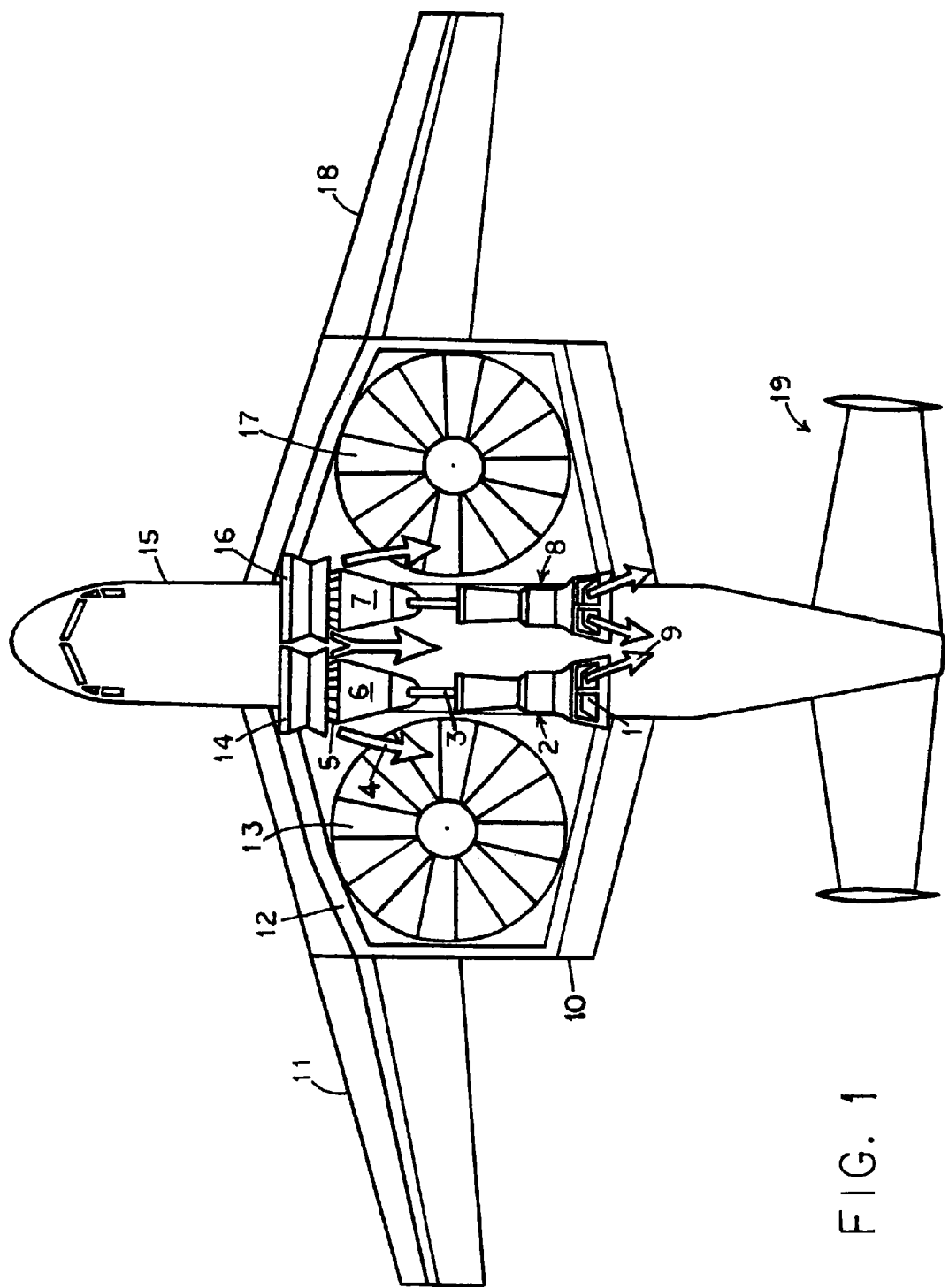
FIG. 1 is a plan view of the top of the VTOL aircraft during cruising flight.

FIG. 1 is an overhead view of a transport aircraft design meant for vertical takeoff and landing ("VTOL") flight. The structure includes a fuselage 15 and outboard wings 11 and 18. There is a twin-tail assembly 19 resembling that of the V-22 Osprey, but used here to stay clear of hot exhaust gas 9. Lift fans 13 and 17 are journaled for rotation in pylons such as 10, but here they are stopped because the aircraft is in horizontal flight, sustained by outboard wings 11 and 18.

Cruising flight is examined first. Gas turbine engines 2 and 8 are installed on the roof of fuselage 15. Gas turbine engine 2 is a turboshaft engine which generates most of its power as a torque on driveshaft 3. Driveshaft 3 continues forward and turns a front fan 14. Fan output is jets of air such as 4 which flow backward and create the thrust for level flight. Boost compressor 6 s inactive during cruise. Therefore, the whole of gas turbine engine 2, driveshaft 3, and front fan 14 is just a turbofan engine. It is stretched out more than other turbofan engines, but works much the same. Gas turbine engine 8 on the right is identical, and produces thrust from front fan 16.

Front fan 14 is the only load on gas turbine engine 2 during cruise. The casing just ahead of boost compressor 6 pinches inward to the smaller diameter 5 seen. This allows the output 4 of front fan 14 an exit to the outside, in order to produce forward thrust for cruise flight. The inward pinch 5 in the casing is done by moveable flaps, to be shown in detail later. With boost compressor 6 unloaded, a turbine stage can be disabled. Bypass doors 1 drop down, creating an early exit for working gas 9. To be shown in FIG. 4.

The large hole in pylon 10 for lift fan 13 creates drag in cruise flight. Four hinged semi-circular doors could be added to restore streamlining to pylon 10, but they would weigh a lot, so they are omitted. The amount of drag of the open hole relates to data for the OH-58D "Kiowa" helicopter. With its large side doors omitted, there is a drop in speed from 120 knots to 110 knots. This is a loss of 10/120=8.3%. It seems acceptable here in order to save perhaps 2,000 lbs as a total weight of eight doors.

Vertical flight is next. In FIG. 2, VTOL mode, lift is provided by 16-foot lift fan 13 mounted in pylon 10, and lift fan 17 at the right. Lift fans 13 and 17 rotate rapidly, intaking air from above and exhausting the air downward at high velocity. The invention is shaped by the need to generate a great deal of power for VTOL flight (17,282 HP at two lift fans.) The power to turn lift fan 13 comes from a 2-stage turbine 26 hung from housing 27 and located below pylon 10 (the pylon is drawn transparent to parts 22, 25, and 26.) Turbine 26 is powered by hot working gas from combustion chamber 25, which is fed compressed air 23 by duct 22. There is a fuel injector 24. Duct 22 extends back to collector scroll 29 of boost compressor 6, the source of compressed air 23. The intake to boost compressor 6 is the output of front fan 14 trapped by the flaring outward of valve petals 5. There is a shutoff valve 28 after collector 29. Valve 28 is wide open to allow the flow of compressed air 23 into duct 22. The totality of gas turbine engine 2, drive-shaft 3, front fan 14, main flow valve 5, boost compressor 6, compressed air duct 22, combustion chamber 25, and lift fan turbine 26 is the "VTOL engine." It is noted that the powerplant components in FIG. 2 are drawn large for clarity but would be smaller in real life when sized for powering of 16-foot lift fan 13.

The main difference between FIGS. 1 and 2 is that the "pinch" at numeral 5 in FIG. 1 has been turned into a "flare" 5 in FIG. 2. "Petals" 5, alternatively described as "flaps" 5, are nominally the same all the way around the circumference of the casing. Petals 5 flare outward against the inside of the fan duct to trap the lightly compressed air issuing from front fan 14. That air ("blower air") now becomes the feed into boost compressor 6. This is the start of operating the "VTOL engine."

The collection of moveable petals 5 constitutes the main flow valve. It is already known in the art. U.S. Pat. No. 3,016,698 uses one (his numerals 50-51) to send front fan air to bypass, for thrust, or else to his high pressure compressor. In choosing different flow paths for blower air, that is similar to our use.

In normal VTOL flight, gas turbine engine 8 and the rest of its associated driveline power lift fan 17. It would function the same as the VTOL engine which uses gas turbine engine 2. However, in an abnormal situation, gas turbine engine 8 is drawn as stopped in FIG. 2. Boost compressor 7 is inactive too. Shutoff valve 20 closed to prevent backflow leakage. Crossover passage 21 then takes half of compressed air 23 and sends it as compressed air 72 to the turbine for lift fan 17. To be re-visited.

In general, the discussion centers on gas turbine engine 2 and its associated "VTOL engine." Gas turbine engine 8 and its related equipment are almost identical, therefore largely ignored.

Returning to normal VTOL flight, FIG. 3 shows the prime mover. Gas turbine engine 2 is a twin-spool engine. High pressure turbine 34 in the core engine drives a conventional axial compressor 33. A combustion chamber at numeral 2 completes the core engine. There are two stages of low pressure turbine. The first stage 37 and last stage 36 together develop the power to turn front fan rotor and the rotor inside boost compressor 6 via driveshaft 3. The hot exhaust from low pressure turbine stage 36 is to atmospheric pressure, which allows the low pressure turbine to develop maximum power for VTOL flight. Boost compressor 6 takes the output 30 of fan rotor 39, which is at a pressure ratio typically 1.6:1, and compresses it further. Since there are four stages of boost compressor 6, plus that one stage of front fan 39, low pressure turbine stages 36 and 37 have a large load to power.

Ducts 32 and 82 take some compressed air 31 to axial compressor 33 in order to supercharge it. It's one way to generate more power. To be covered in detail later. For now, one can visualize that turbine stage 37 powers front fan rotor 39, and much larger stage 36 would power the much bigger load of boost compressor 6. That division of work between turbine stages 37 and 36 will be implemented later.

The main item seen in FIG. 3 is the very important flow control valve, also known as the main flow valve. For VTOL, petals 5 with a pivot like 38 at the rear flared outward to direct the output air-flow 30 from fan rotor 39 inward to boost compressor 6. The total of five stages may produce a pressure ratio of 5:1. This is about the minimum pressure ratio for a VTOL engine—Just high enough for tolerable cycle efficiency. Compressed air 23 at 73.5 psia will head for a lift fan turbine. A front view of this distribution is seen in FIG. 5.

In FIG. 5, compressed air 23 enters compressed air duct 22 and flows toward lift fan turbine 26. Compressed air 58 takes a mirror-image path. Compressed air 58 came from the boost compressor behind front fan 16. Compressed air 58 flows toward the other lift fan turbine 59 but will enter a combustion chamber first (not shown) to create the working fluid. If compressed air 58 stops for any reason, compressed air 23 will divide and half of it will flow through crossover passage 21 to feed lift fan turbine 59. This keeps the aircraft level during a VTOL emergency. More detail later.

Cruising Flight II

In FIG. 4, the main feature is that valve petals 5 have rotated around their hinges 38 in back, so that their noses contact and seal against cone 40. The output of fan 39 flares outward, then backward as fan flow 4 to produce forward thrust as in FIG. 1. Interleaving of petals 5 as their noses contract to a smaller diameter was considered in U.S. Pat. No. 3,280,560. Its FIGS. 5 and 6 show a preferred shape for the petals. Ours would be similar. Upon closing of valve petals 5, boost compressor 6 is isolated from blower air 4 and does no work. This recognizes that it takes much less power for cruising than for VTOL. Accordingly, ducts 32 and 82 open up to the outside and bring ambient air 44 as intake to compressor 33, which is no longer super-charged.

This concludes the description of the flaring or pinching of petals 5. They perform the function of the main airflow valve in the present invention. That function is the same as flow control valve 102 in FIG. 2 of U.S. Pat. No. 5,275,356. Valve 102 routes the flow from his front fan 46 into his boost compressor 103. However, part of his fan flow can go to the fan duct and out through the exhaust nozzle 34, under control of his fan duct blocking door 122. The exhaust nozzle turns downward to generate vertical lift for the rear half of the aircraft. His boost compressor flow eventually powers a lift fan at the front of the aircraft. Thus, our flow control valve 5 duplicates only his flow control valve 102. However, his concurrent use of fan duct blocking door 122 means that his valve 102 cannot duplicate the function of our main flow valve 5.

In the case of U.S. Pat. No. 3,149,461, it is perhaps closer to ours because of his single flow control valve 15. Turning his large fan power unit 16-19 ninety degrees to vertical would create a lift fan. Any similarity to our lift fan powerplant ends there because his tapping 23 is always open. During his high-power mode, tapping 23 diverts about half of his remote compressor 7 discharge to thrust out through his nozzle 3. That leaves his large fan power unit developing about half of its potential power. We try to maximize our hi-power mode.

Returning to cruise flight in FIG. 4, rotor 49 of boost compressor 6 always turns—A loss because that churns the air inside during cruise. FIG. 4 shows equipment to remedy this. Shutoff valve 28 closes off the boost compressor 6 volume. Tank 47 contains compressed hydrogen. Valve 48 releases the hydrogen gas into the cavity of boost compressor 6, pushing the air out through some leak behind the rotor. A convenient place for the leak is gap 46 in the wall just ahead of cutoff valve 28. The rotor is now immersed in the light gas. The molecular weight of hydrogen is 2, that of air is 29. The churning loss drops to 2/29=7 percent of what it was. It means a significant saving of power for long flights. Once the cavity of boost compressor 6 is full of hydrogen, valve plate 28 can turn a few degrees counter-clockwise to block gap 46. Then hydrogen feed can cease.

Using helium instead of hydrogen doubles the molecular weight to 4. This lowers the saving in churning loss, but also halves parasitic leakage which may exist. Finally, an alternative to filling with light gas is just to evacuate boost compressor 6 with an air pump 41.

Emptying boost compressor 6 of air to unload it is one alternative to using a clutch like 106 in FIG. 2 of U.S. Pat. No. 5,275,356. The advantage of air emptying is that rotor 49 can be attached solid to driveshaft 3. The rigidity of rotor 49 adds to that of driveshaft 3 and reduces driveshaft whip or twist. That may be an important advantage in a long driveline like the one in FIGS. 3-4.

The off-loading of boost compressor 6 requires a matching response in the low pressure turbine. Similar to FIG. 1, bypass doors 1 in FIG. 4 pivot at the rear. The front of door 1 drops down to a smaller diameter. In other words, just like valve petals 5. Pivoting of doors 1 creates holes in the turbine housing. The holes let working gas 9 exit before last stage 36 of the low pressure turbine, thereby idling it. This follows the example of flaps 21 in U.S. Pat. No. 3,867,813. However, last stage 36 still turns, churning ambient air which creates a loss. Adding a free-wheel clutch 45 cuts the loss way down. There is such a clutch 77 in U.S. Pat. No. 3,472,487.

When gas turbine engines 2 and 8 of FIG. 1 are the only things producing power, they can be considered to be "cruise engines." But when lift fan turbines 26 and 59 of FIG. 5 are also producing power, gas turbine engines 2 and 8 are just part of "VTOL engines". That's because gas turbine engines 2 and 8 power the boost compressors, doing double duty and saving much weight. More importantly in a military situation, in FIG. 1 the unitary drivelines benefit from the protection by the bulk of fuselage 15. If cruise engines were separate, they wouldn't fit atop the fuselage. They'd be exposed to small arms fire.

VTOL Flight II

FIG. 6 shows lift fan turbine 26 located under pylon 10. As in FIG. 2, turbine 26 receives hot working gas from combustion chamber 25. Chamber 25 is shifted downward (as in FIG. 2) to provide clearance for C-beam 50. Turbine 26 is attached to housing 27 from which C-beams 50 and 61 transmit the fan lift to main spars 12 and 71. At the top of the housing 27 tower is the rotation band 13 of the lift fan blading. This is the blading 13 seen in FIG. 2. Below that, in FIG. 6 there is a ring of stators 62 which take the swirl out of the lift fan flow.

Housing 27 will contain the reduction gear to decrease the high RPM of lift fan turbine 26 by a ratio of about 1:5. This is to turn the much larger lift fan 13 at an acceptable speed. A simple planetary reduction gear can resemble the 1:16 ratio gearing in the "Aviation Week & Space Technology" article cited above in "Background of the Invention."

In that same article, the small size of their lift fan turbine stands out. Like ours, it's because the turbine does not supply the power to turn the compressor for its own working gas feed. Their air came from a bank of gas turbine engines as ordinary bleed flow. In our aircraft, a small lift fan turbine 26 would be a smaller target in a military setting. Just how small can be estimated. If the pressure ratio of our VTOL engine is 5:1, then a calculation using thermodynamic charts shows that compressor work is 41% of net turbine work. So, lift fan turbine 26 can be 1/1.41=71% of normal bulk. If pressure ratio is 13.5, then compressor work equals net turbine work and lift fan turbine would be half-size. Half of the flow area, that is, so $\sqrt{2}/2=0.707$ of normal diameter.

The use of high-speed lift fans 13 and 17 takes a lot more power than do the large, slow-turning rotor blades used in helicopters and the V-22 Osprey. There is a need to increase gas turbine engine 2's power for turning boost compressor 6.

Supercharging comes to mind, as seen in FIG. 3. U.S. Pat. No. 3,867,813 recognized this option for VTOL flight. It seems advisable to verify the amount of supercharging needed for gas turbine engine 2 (and 8.)

Fan Lift and Efficiency

The oldest VTOL aircraft is the Harrier, a subsonic fighter plane. Now a new supersonic fighter, the F-35, will land vertically. U.S. Pat. No. 5,275,356 states that the ratio of VTOL lift power to cruise power can be as much as 10:1. His patent, is fighter planes, in which the VTOL lift is by high-speed jets. These are even more inefficient than our wing fans (compared to large, slow-turning V-22 Osprey rotors). From FIG. 20 of Paper 700286, Transactions of the Society of Automotive Engineers, 1970, typical wing fan velocity is about 450 ft/sec, and representative lift jet velocity is 1600 ft/sec. It's easy to compute the lift efficiency. "Lift" is the downward momentum of the air, or "mv". Work expended is the kinetic energy of the air, or "½mv²". Lift efficiency is lift/work, or $mv/\frac{1}{2}mv^2=2/v$. Thus, a high-speed jet is less efficient. Our lift fan efficiency is (2/450)/(2/1600)=1600/450=3.56 times that of a lift jet. Our cycle variability may only need to be a factor of 10/3.56=2.81.

Cycle Variability

Accordingly, the "VTOL engine" needs to develop 2.81 times the power of the cruise engine which uses gas turbine engine 2. If cycle parameters are the same, then the intake to front fan 14 in FIG. 2 must flow 2.81 times as much air as the intake to gas turbine engine 2. But this reveals nothing about the cycle variability which is needed for gas turbine engine 2 itself. It obeys a completely different requirement.

Whatever power gas turbine engine 2 generates for cruise flight as in FIG. 4, it must generate five times as much power for VTOL flight as in FIG. 3. Although not immediately obvious, it follows from counting the compression stages. These are the load. There is one stage of front fan 39 during cruise, plus four stages of boost compressor 6 during VTOL. All the stages develop the same work. Not the same pressure ratio, because air temperature increases, but the same temperature rise per stage. Then the rule of work equivalence of heat holds from thermodynamics. Therefore, the cycle variability from comparing the stage counts is a factor of (1+4)/1=5.0.

That is a lot. Supercharging gas turbine engine 2 is the start of achieving it. Reheat will be used too. Reheat can add up to 40% to cycle work. Supercharging itself was achieved by the added ducts 32 and 82 of FIG. 3. They take some air 31 at up to 73.5 psia from boost compressor 6 and route it to the intake of axial compressor 33. The greater pressure of compressed air 31 means the density is greater too—But not 5.0 times greater. That's because of the temperature rise, which re-expands the compressed air.

The best-known example of a 7-stage axial compressor driven by a single-stage high pressure turbine, like our 34, is the Rolls-Royce Olympus 593 turbojet. It even has two such spools, the low-pressure spool also driven by a single-stage turbine. The overall pressure ratio is 15.5:1. The pressure is 228 psia. The temperature rise, from ambient of 70° F.=530° R, is 1161−530=631°. Using again the principle of equal temperature rise per stage, then the two 7-stage spools divide the temperature rise of 631°, giving 315° for each. This is an output temperature of 530+315=845° R for the low pressure spool. From the thermodynamic chart, the pressure is 77 psia, which gives a pressure ratio of 77/14.7=5.2:1.

However, a 7-stage axial compressor in the J-83 turbojet gave a pressure ratio of 7:1 (Journal of Engineering for Power, July 1961, page 291.) Therefore, FIG. 3 shows a two-spool engine with a 5-stage "low-pressure" compressor 39+6, and probably a 7-stage high-pressure compressor 33, totalling 12 stages. A survey of 2-spool turbofan and turbojet engines with single-stage high-pressure turbines (like our 34) yields these two turbojets close to our twelve stages of compression:

| | Compressor Stages | | | Pressure | Thrust, |
|---|---|---|---|---|---|
| Engine | Low-P. | Hi-P. | Total | Ratio | lbs |
| Olympus 593 | 7 | 7 | 14 | 15.5 | 32,500 |
| Khatchaturov R-29 | 5 | 6 | 11 | 13.1 | 17,635 |

The engine data herein, except for the J-83, comes mostly from JANE's All the World's Aircraft, 1978-79, 1987-88, 1994-95.

Only a small advance from the technology of these engines would allow our axial compressor 33 boosted to a total of 12 stages to develop a pressure ratio of 15:1. Indeed, a 9-stage axial compressor in the GE F-101 turbofan developed a pressure ratio over 11:1 in 1978. But we would like 18:1. The GE F-404 low-bypass turbofan from 1987 has a 3-stage fan and a 7-stage high pressure compressor. It reaches a pressure ratio of 20:1 from its total of ten stages. Its thrust is 18,000 lbs, therefore about the same number of HP. Our gas turbine engine 2 of 2,770 HP would suffer the inefficiency of scale-down, but 18:1 from our more numerous 12 stages should be attainable with modern blading technology.

The rise in charge density after compressing the boosted intake in axial compressor 33 is the inverse of the decrease in volume. The data in the Table are from a thermodynamic chart for air compression. Compressor efficiency is set at 85%.

| Pressure Ratio | Pressure PSIA | Condition | Ideal T, °R | Actual T, °R | Volume cu ft/lb |
|---|---|---|---|---|---|
| 1.0 | 14.7 | Ambient | 530 | 530 | 13.33 |
| 7.0 | 103 | Non-boosted | 930 | 1001 | 3.60 |
| 18.0 | 264.6 | Supercharged | 1211 | 1332 | 1.863 |

Charge density goes up by 3.60/1.863=1.9326. This is the factor for increase in power of gas turbine engine 2. It is far short of the 5.0 needed.

Reheat

In FIG. 3, reheat injector 35 may spray fuel after high pressure turbine stage 34, following the example in U.S. Pat No. 3,967,813, FIG. 2, to handle a VTOL-related load. In ours, the placement of injector 35 ahead of low-pressure stage 37 promotes impact vaporization of the fuel droplets, also keeps injector 35 out of the way of pivoting doors 1.

A current textbook on gas turbine engines compares the cycle work of reheat cycle versus simple cycle. At a turbine inlet temperature of 2200° F., a typical value nowadays, and an air T=70° F., its ratio (in °R) of $T_3/T_1$=5. In its graphs, reheat cycle delivers 24% more work at pressure ratio=10, 29% more work at pressure ratio=15, and 32.4% more work at pressure ratio=18 (extrapolated.) Comparing to simple cycle at pressure ratio=7 (non-boosted), the specific work increases by 50.1%. The density increase factor was 1.9326. The total increase factor is (1.9326)(1.501)=2.9—Still short.

Part-Load Operation at Cruise

One solution has the advantage of great simplicity: Running gas turbine engine 2 at 2.9/5.0=58.1 percent power during cruise flight. Then 2.9/.5812=5.0 all right. However, there is a drop in RPM, pressure ratio and cycle efficiency at reduced power. The decrease in efficiency can be estimated from data for actual engines. First, an example from the Olympus 593 is used.

The data for part-load operation comes from Paper 751056, Transactions of the Society of Automotive Engineers, Vol. 84, 1975, "Future SST Engines with Particular Reference to Olympus 593 Evolution and Concorde Experience." FIG. 11 shows the curve (marked λ=0) of specific fuel consumption ("SFC") at cruise for various settings of specific thrust. The advertised figure is SFC=1.19 at normal cruise. The graph shows the minimum SFC of 1.187 at specific thrust of 37.07. Our proposed cruise setting of 58.1% power corresponds to their (37.07)(0.581)=21.5 specific thrust. The SFC from the graph is 1.377. This is an increase of (1.377/1.187)−1=16%. Cruise power efficiency is 1−0.16=84 percent of full power.

In the 1500-HP TV2-117A turboshaft engine, there is an SFC increase from 0.606 to 0.683 as the output drops to 67% power. Extrapolating to 58.1% power gives a total SFC increase of 14%. Cruise efficiency would be 1−0.14=86 percent. This is remarkably close to the estimate for the Olympus, given the large difference between powerplants. Thus, a cruise-to-maximum power efficiency estimate of 85% may be believable and acceptable. The design exercise seems to be over. A variable-cycle VTOL powerplant may be made practical.

Cruising Flight III

Supercharging is not wanted then. In FIG. 4, door 43 is part of supercharging duct 32. Door 43 turns about pivot 42, dropping into the interior of duct 32. An opening is created through which ambient air 44 flows to become intake air to axial compressor 33. A similar door is fitted to supercharging duct 82. Now compressor 33 delivers a maximum pressure ratio of 7:1, not the 18:1 when supercharged.

To power the lighter load, bypass doors 1 drop down, revealing some openings which exhaust working gas 9 before it reaches low pressure turbine stage 36; as seen previously.

Doors 43 et al when pivoted inward as in FIG. 4 touch the inside walls of ducts 32 and 82, preserving the closing off of boost compressor 6, so that the filling of it by hydrogen gas 47 as presented earlier (or just pumping out the air) isn't subject to a large leak.

Compressor Blading Design

This has reached new heights of performance with the help of flow modeling by computer. For instance, the 3-stage front fan of the GE F404 low bypass ratio turbofan is reported to give a pressure ratio of 4.2 to almost 5 (Journal of Engineering for Gas turbines and Power, 113:5, 1991.) Thus, the number of our compression stages might be less than 12. But the whole calculation above for cycle variability is not invalid. Front fan 39 is preferred as a single stage in any case, like in all turbofan-powered airliners. This is for a relatively low fan pressure ratio, about 1.6:1, giving a low fan flow velocity for a high propulsive efficiency. Then our boost compressor 6 must have a greater native pressure ratio to reach an overall 5.0 for the VTOL engine. This means several axial stages, as shown herein; or perhaps a centrifugal stage. Pressure ratios above 5.0 are not ruled out for the VTOL engine, but it means more compression stages and more weight.

VTOL Power

The total installed power including cruise engines 2 and 8 will be about (2.81)(6,150)=17,282 HP. It compares to twice 6,150=12,300 HP for the T-406 engines of the V-22 Osprey. Of course, our powerplants are fully committed. There is no reserve for an engine-out emergency. It's because the inefficiency of our 16-foot lift fans, compared to Osprey's 38-foot rotors, uses up the whole 17,282 HP. Only the presence of stored emergency propellant and ducting 63-70 in FIG. 6 prevents having to double the installed power.

VTOL Emergency Procedure

FIG. 2 shows a situation where there is no longer any compressed air being delivered by boost compressor 7. There could be several reasons. For one, gas turbine engine 8 has stopped turning. In a military situation, enemy fire could have fatally impacted gas turbine engine 8. Then boost compressor 7 would stop turning too. Another possibility is that bird ingestion by front fan 16 had bent the blades and the fan can no longer turn.

At this time, crossover passage 21 is activated and takes one half 72 of the output of boost compressor 6. Compressed air 72 substitutes for the compressed air which normally was produced by boost compressor 7. It is a temporary fix which will not last long. One thing which had to happen immediately is that shutoff valve 20 closed to prevent backflow leakage through stopped front fan 16. Thus, both lift fans 13 and 17 keep turning, and the aircraft does not roll over because of unbalanced lift. However, each lift fan 13 or 17 now only receives half of the normal power. The aircraft starts to sink rapidly.

Restoring lift fan engine power is seen in FIG. 6. (FIG. 6 is actually on the other side of the aircraft from the side where the power failed. It doesn't matter because each side is a mirror image of the other. The present side was chosen because all of its parts are already numbered in FIGS. 2-5.)

Restoring lift fan engine power to turbine 26 is suggested by U.S. Pat. No. 3,093,968: Applying emergency propellant held in reserve directly to the turbine. Tank 63 of liquid hydrogen peroxide releases it through valve 64 to catalyst bed 65. The output in conduit 66 is the decomposition products of the hydrogen peroxide, namely water as steam, and molecular oxygen. Literature examples show decomposition products at about 1300° F. and 400 psia going into rocket turbines for auxiliary power. Some writers cite T=1450° F. and P=500 psia. These gases will flow the length of conduit 66 and empty out through opening 67 which is cut from the top of turbine-supply scroll 60. Opening 67 is exposed when side flaps 68 and 70 pivot from hinges at the top of the flaps to hang down as shown. The wall of scroll 60 is drawn as cut open at the front in order to reveal items 67-70. The decomposed hydrogen peroxide gases 69 replace the working gas formerly produced by combustion chamber 25.

Decomposition gases 69 at some 450 psi compare to compressed air at 73.5 psia, the 5:1 pressure ratio air formerly coming from boost compressor 6. The density of the new working fluid will be six times what the old one was. It's advisable to operate turbine 26 as a partial admission turbine. Flaps 68 and 70 accomplish that by extending conduit 66 downward and blocking the flow of working gas 69 to the sides. Flaps 68 and 70 bridge the depth of scroll 60 and reach the top of the turbine 26 housing. This is the start of the ring of stators. Only two stators 73, 74 are shown.

Flaps 68 and 70 may touch the leading edges of two stators to make a seal, or just come close to make a clearance seal.

Between flaps 68 and 70 is a subtended angle of some 60 degrees, which is about one-sixth of the 360 degrees of former full admission around scroll 60. This accommodates the density six times higher. During normal VTOL, flaps 68 and 70 swing upward out of the way. They do not have to seal opening 67 since there is little backflow if valve 64 is closed.

During emergency VTOL, fuel may be injected (not shown) into conduit 66 in order to combust with the oxygen, increasing the enthalpy of the new working gas; like in U.S. Pat. No. 6,766,638. There seems to be no problem in making lift fan turbine 26 develop full power again. The emergency is over. Of course, tank 63 can hold only so much hydrogen peroxide until the weight becomes prohibitive. There wouldn't be much time to stay aloft. The best plan may be to make an immediate landing if the emergency occurs below, say, 750 feet above the ground. (750 feet matches the altitude for a safe auto-rotation landing by a helicopter with zero forward speed.) Above 750 feet, a steep dive to pick up speed, then a pullout and glide are possible.

Toward the latter, FIG. 1 shows an aerodynamic detail of importance. The center of gravity of the aircraft is necessarily along a line joining the hubs of lift fans 13 and 17. But outboard wings 11 and 18 have their aerodynamic centers slightly ahead of those hubs. So, when the aircraft has gathered speed in a dive, the increasing lift from wings 11 and 18 will pull the nose up automatically to establish the glide. The pilot doesn't have to do much controlling.

This nose-up moment is countered in FIG. 5 during cruise flight by the nose-down moment from the thrust of front fans 14 and 16 mounted high on the fuselage. So, the aircraft tends to trim itself during cruise. If the power is off, as in a glide, then in FIG. 1 a large horizontal tail 19 can provide the up-load which would simulate the pitch-down moment of front fans 14 and 16. This concludes the narrative for the basic VTOL emergency procedure.

Landing Gear

As mentioned above, when engine failure occurs below 750 feet above the ground, the hydrogen peroxide option is exercised, but the aircraft must descend as quickly as possible to a vertical landing before the hydrogen peroxide runs out. Evidently, the amount of hydrogen peroxide stored must conform to that flight plan. But circumstances vary, and probably there will be a hard landing sooner or later. The main landing gear 51-56 in FIG. 6 may handle it. Compression rod 56 has an unusually long travel to absorb a lot of energy. Cylinder 51 has enough length to accommodate the long travel. There is a piston 54 for the compression, and a guide rod 52 extending all the way up cylinder 51 to keep piston 54 from getting off-center or binding. With the landing gear cross-shaft 53 set for turning in pillow block 55, cylinder 51 can be turned ninety degrees to horizontal during cruise, for less drag.

FIG. 5 shows the aircraft after landing. Piston 54 is at the top of its stroke, and guide rod 52 has extended all the way up, including through pylon 10 which must have a pre-arranged opening.

VTOL Emergency Procedure II

Now returning to FIG. 2 where gas turbine engine 8 is drawn as stopped. As before, anti-backflow valve 20 has immediately closed, and only boost compressor 6 is producing compressed air. There is one new issue. Although it is not drawn as such, anti-backflow valve 28 must partly close at that time. This is to simulate the normal back pressure for boost compressor 6. Otherwise, here is what would happen. The output of boost compressor 6 divides at crossover passage 21 and now goes to two lift fan turbines instead of one (turbines 26 and 59 in FIG. 5.) The flow restriction represented by turbine blading is halved because the, turbine area is doubled. The pressure in compressed air ducts 22 et al drops considerably. The pressure drop carries back to the discharge of boost compressor 6. That flow expands abnormally. The last stage chokes and the front stages surge. Partly closing backflow valve 28 stops all that by restoring back pressure.

When hydrogen peroxide decomposition power kicks in, valve 57 in FIG. 5 can close crossover passage 21. Then backflow valve 28 of FIG. 2 can re-open completely, for maximum power at lift fan 13.

Relation to Existing Turbine Engines

A survey of small turbofan engines finds four which have axial-flow compressors and single-stage gasifier turbines. The compressors have 5 or 7 stages, therefore these core engine spools are similar to the one in our gas turbine engine 2. The core engines develop 2200 to 3500 HP. Our gas turbine engine 2 needs to produce 2,770 HP in order to turn the "VTOL engine" compressor 39+6 big enough to feed our lift fan turbine 26 (and the same for 59): Sufficient power to lift a prototype aircraft 64 feet long and capability similar to the V-22 Osprey.

From a survey of turboshaft engines, a good candidate is the T800-APW-800 from 1987. It was rated at 1,200 HP and has a pressure ratio about 9:1. The low pressure turbine is on a separate shaft from the core engine turbine and has a much larger diameter. In other words, slower turning, therefore suitable for powering a large front fan and boost compressor in our powerplant. With supercharging added, it could produce (1.9326)(7/9)(1200 HP)=1805 HP. (7/9 is the ratio of the native pressure ratios.) 1805 HP can power the compression for a VTOL engine of which two could lift 65% of Osprey weight—A potential engine for building a prototype aircraft.

Comparing to Osprey's powerplant, our installed full-size air-craft's power would be (17,282 HP/12,300 HP)=1.405 times as much. Osprey's two T-406 engines weigh 2×970 lbs=1940 lbs. Our weight penalty is (405)(1940)=787 lbs. To that must be added twice the weight of emergency power items 63-70 from FIG. 6, say 1,480 lbs, giving a total of 2,267 lbs. However, two Osprey 38-foot rotors weigh 4,654 lbs (JANE's, 1998-9, p. 557.) Comparing rotor and lift fan areas, our lift fans might weigh $(16/38)^2$ =18% as much, or 840 lbs. Our total weight of lift fans plus power plant weight penalty would be 840+2267 =3107 lbs. Subtracting from Osprey rotors weight gives 4,654−3,107=1,547 lbs. This weight difference is now in our favor. It would apply to offset the weight penalty from the known inefficiency of any wing structure which encloses a large cutout for the lift fans. This concludes a design exercise for a VTOL transport aircraft sustained by lift fans instead of free-standing rotor blades.

The scope of the invention is found in the appended claims.

The invention claimed is:

1. A powerplant for a VTOL aircraft with a lift fan; said powerplant including a lift-fan engine and a cruise engine; most of said cruise engine being part of said lift-fan engine; but during cruise flight, said cruise engine operating while said lift-fan engine does not;
   said cruise engine including a gas turbine engine, a driveshaft, a front fan, and a main flow valve; said main flow valve located downstream of said front fan; said front fan being much smaller than said lift fan;
   at all times during any normal flight:
      said gas turbine engine powering said driveshaft; said driveshaft turning said front fan; said front fan producing lightly-compressed air to be known as "blower air";

for said cruise flight:
  said main flow valve being contracted to a first position, causing release to the atmosphere of said blower air backward to produce forward thrust;
said lift-fan engine including a boost compressor connected to said driveshaft and downstream of said main flow valve, a compressed air duct, a combustion chamber, a lift-fan turbine, and said cruise engine with one item different; said one item being said flow valve expanded to a second position;
for VTOL flight:
  said main flow valve in said second position causing said blower air to be trapped and become feed to said boost compressor;
  said boost compressor raising the pressure of said blower air;
  the delivery air of said boost compressor reaching said compressed air duct;
  said compressed air duct taking most of said delivery air to said combustion chamber where fuel and ignition are added to create working gas;
  said working gas expanding in said lift-fan turbine to create shaft work for powering said lift fan;
said main flow valve being substantially a ring of flaps between said front fan's duct and a casing for said boost compressor; a hinge at the rear of each said flap; said hinges fixed at or near the front of said casing; the noses of said flaps pointing generally toward said front fan;
for said VTOL flight:
  said noses of said flaps pivoting outward to said second position; said noses touching said front fan's said duct; said touching preventing said release of said blower air; said flaps instead guiding said blower air into said boost compressor;
for said cruise flight:
  said noses of said flaps pivoting inward to said first position;
  said noses of said flaps turned downward in front of the inlet to said boost compressor; said flaps blocking said inlet; said blocking disabling said boost compressor and causing a reduction in the load on said driveshaft;
said gas turbine engine having several stages of turbine; a later said stage having bypass means for responding to said reduction in the load; said turbine having a housing; said bypass means being a movable portion of said housing; said movable portion located ahead of said later stage;
for said cruise flight:
  said movable portion moving to create a hole in said housing;
  said hole venting the pressure of said working gas before said later stage; said venting reducing said later stage's work of expansion;
for said VTOL flight:
  the operation of said boost compressor causing a load increase on said driveshaft compared to said cruise flight; said movable portion moving back to close said hole in order to restore said later stage's said work of expansion;
supercharging means for said gas turbine engine to additionally handle said load increase; said supercharging means including ducting connecting said boost compressor's said delivery air to the intake of said gas turbine engine; valving in said ducting;
for said VTOL flight:
  said valving keeping said ducting open; said ducting conveying a small fraction of the total said delivery air; said delivery air being at greater density than ambient air or said blower air; said greater density causing said gas turbine engine to produce more power to said driveshaft;
for said cruise flight:
  said valving keeping said ducting closed; said valving selecting for said gas turbine engine an intake air path from outside said ducting; said intake air path from outside capturing air at a lower density than said boost compressor's said delivery air;
  said lower density reducing the power produced by said gas turbine engine, in keeping with the lighter load on said driveshaft caused by said disabling of said boost compressor.

2. The device of claim 1 in which a collector scroll connects the output end of said boost compressor to said compressed air duct; the front of said ducting connecting to said collector scroll; said valving comprises pivoted doors in the walls of said ducting; openings in said walls to the outside behind said pivoted doors;
  during said VTOL flight, said pivoted doors being substantially flush with said walls and disabling said openings;
  for said cruise flight, said doors turning inward into said ducting, thereby closing off said ducting from said collector scroll; said doors simultaneously enabling said openings to the outside for the intake of ambient air by said gas turbine engine.

3. The device of claim 1 in which said front fan has a hub and said boost compressor has a rotor; said hub, said rotor, and said driveshaft always rotating together; said compressed air duct includes a shutoff valve downstream of said boost compressor; said shutoff valve having a closed setting during said cruise flight;
  said main flow valve in said first position and said shutoff valve in said closed setting defining a substantially closed volume containing said rotor; said boost compressor thereby being isolated while said rotor is still being turned by said driveshaft;
  evacuation means connected to said closed volume; said evacuation means removing most of the air from said closed volume during said cruise flight, in order to reduce the aerodynamic losses from the blading of said rotor against air left in said closed volume;
  thereby allowing said rotor to be firmly attached to said driveshaft in order to strengthen the latter.

4. The device of claim 3 in which said evacuation means include a tank holding pressurized gas of molecular weight lighter than air, said tank having a connection to said closed volume; the outflow from said tank controlled by a third valve;
  a leak in said compressed air duct, said leak being open at least part of the time during said cruise flight; said connection pointing toward one end of said closed volume; said leak being at the other end of said closed volume;
  said third valve opening at least for a time during said cruise flight, in order to admit said gas into said closed volume; said gas displacing most of the air from said closed volume by pushing said air out through said leak.

5. The device of claim 3 where said evacuation means is an air pump.

* * * * *